UNITED STATES PATENT OFFICE.

THOMAS H. FOULDS, OF CINCINNATI, OHIO.

WHEAT-MEAL PRODUCT.

SPECIFICATION forming part of Letters Patent No. 327,250, dated September 29, 1885.

Application filed July 6, 1885. (No specimens.)

*To all whom it may concern:*

Be it known that I, THOMAS H. FOULDS, a citizen of the United States of America, and a resident of Cincinnati, in the county of Hamilton and State of Ohio, have invented a certain new and useful Improved Wheat-Meal Product, of which the following is a specification.

My invention relates to a manufactured product of wheat-meal.

The object of my invention is to produce a coarse wheat-meal which is semolino or sand-like in character, obtained from the germ of the grain in a coarse or unreduced state mixed with the hard or glutinous portion of the berry, of a similar consistency or size as the germ, the latter being the principal portion of the product. Again, the coarse and unreduced germs and coarse hard portions of the berry are mixed with the inner or richer portion of the bran.

This product is very nutritious, surpassing oatmeal for all purposes, and making a superior article of meal for both cakes and other similar uses. The product is made from the most nutritious portions of the grain, and I have found by experience that it is superior to any other product of ground wheat for the purposes designed.

My product may be obtained by a gradual, or by a direct reduction process, both of which I will describe. The grain is first thoroughly scoured before reduction.

The direct process consists in crushing the grain either on stones or corrugated rolls sufficiently to free the germ from the berry and to reduce the harder portions of the kernel into particles not larger than the germ. This crushing will reduce the starch or softer portion of the berry more than the harder portions, making a coarse grade of flour. The crushed product is then run through a reel or scalper, the cloth of which is of two grades. The front end of the reel or scalper has fine cloth of about 8 or 10 mesh, preferably for about three-fifths of the length of the reel. The remaining portion of the reel is of coarser cloth, of about 00 mesh. The flour is separated from the coarser or meal product in passing over the fine cloth, and the germ product mixed with the harder portions of the grain is taken out of the tailings by the coarse cloth. This germ product is then purified of fluff and light bran by a light blast in the ordinary manner, leaving the grain and harder portions of the berry and the heavier particles of the bran of a consistency to be used as meal, as before stated.

The gradual-reduction process consists in breaking the wheat open by a slight reduction on stones or corrugated rollers, then running the product through a similar reel or scalper used in the direct reduction. This scalper will take out flour on the first end of the reel for the usual flour products, and some germ-meal at the rear end of the reel, which is a part of my meal product. The tailings are still further reduced and treated by a similar scalper or reel, and the germ and harder product obtained and mixed with the first germ product. There may be several of these gradual reductions. When the first reduction is so slight as to only slit open the kernels, the germ is about all of the product that can be obtained from the rear portion of the reel by the first reduction, and the harder coarse portions of the berry are obtained in the secondary reductions, which must be mixed with the germs to produce my meal. A partial reduction of the germs, so long as they retain their coarse or sand-like character, will not materially affect the product.

Instead of using a scalper or reel of two grades of cloth, two reels, each of the requisite grade, may be employed.

Heretofore the germ has been separated from grain in a flattened condition; but such of itself is too oily, pasty, or sticky to adapt it to be cooked for making cakes, boiled puddings, and similar things. The chief use for my product is as a substitute for oatmeal and cracked wheat; and in manufacturing my product I take the germ practically whole or unreduced, to avoid the sticky or pasty result, and mix it with the larger portion of the harder part of the grain, this combination of the whole or entire germs with the equally-sized portions of the bran and gritty parts of the grain producing a very superior wheat-meal product, which is semolino or sand-like in character.

I claim—

1. A meal product obtained from a coarse reduction of wheat, consisting of the germs mixed with the glutinous or harder portions of the grain, substantially as specified.

2. A meal product obtained from a coarse reduction of wheat, consisting of the germs mixed with the glutinous or harder portion of the grain and the richer portion of the bran, substantially as specified.

3. The process herein described of making meal, consisting, essentially, in a coarse reduction of the wheat and separating the germ and glutinous portions of the kernel in a coarse meal from the lighter and starchy portions of the grain, substantially as specified.

In testimony whereof I have hereunto set my hand.

THOMAS H. FOULDS.

Witnesses:
E. E. WOOD,
JNO. L. ROEBUCK, Jr.